(12) United States Patent
Son et al.

(10) Patent No.: US 11,535,165 B2
(45) Date of Patent: Dec. 27, 2022

(54) SLIDING TYPE GLOVE BOX

(71) Applicants: KBI DONGKOOK IND. CO., LTD., Seoul (KR); HYUNDAI MOBIS CO., LTD., Seoul (KR)

(72) Inventors: Dong Il Son, Ulsan (KR); Dong Yong Choi, Gyeonggi-do (KR); O Sim Kwon, Ulsan (KR); Tae Yong Eom, Ulsan (KR); Sun Kyung Kim, Ulsan (KR); Chang Bok Park, Ulsan (KR); Ie Seob Park, Incheon (KR)

(73) Assignees: KBI DONGKOOK IND. CO., LTD., Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/387,236

(22) Filed: Jul. 28, 2021

(65) Prior Publication Data
US 2022/0032850 A1 Feb. 3, 2022

(30) Foreign Application Priority Data
Jul. 29, 2020 (KR) .................. 10-2020-0094734

(51) Int. Cl.
*B60R 7/06* (2006.01)
(52) U.S. Cl.
CPC ..................... *B60R 7/06* (2013.01)
(58) Field of Classification Search
CPC ..... B60R 7/06; B60R 7/04; B60R 2011/0005; B60R 2011/0084
USPC ....................................... 296/37.12
See application file for complete search history.

(56) References Cited

U.S. PATENT DOCUMENTS

| 7,258,381 B2 * | 8/2007 | Sturt | B60R 7/04 296/37.7 |
| 8,870,255 B2 * | 10/2014 | Mildner | B60R 7/04 296/37.1 |
| 8,919,852 B2 * | 12/2014 | Schulz | E05B 83/28 49/423 |
| 9,914,398 B1 * | 3/2018 | Sanders | B60R 7/06 |
| 2016/0137137 A1 * | 5/2016 | Shibata | B60R 7/06 296/37.12 |

FOREIGN PATENT DOCUMENTS

| EP | 2397370 A1 | 12/2011 |
| KR | 1998035637 A | 9/1998 |
| KR | 100350274 B1 | 8/2002 |
| KR | 100868151 B1 | 11/2008 |
| KR | 1020140113417 A | 9/2014 |
| KR | 20160020857 A1 * | 2/2016 |
| KR | 102082171 B1 | 2/2020 |
| KR | 1020200063010 A | 6/2020 |

* cited by examiner

*Primary Examiner* — Pinel E Romain
(74) *Attorney, Agent, or Firm* — Hauptman Ham, LLP

(57) ABSTRACT

A sliding type glove box including a housing mounted to an instrument panel and a storage part provided in an inner space of the housing so as to be slidably withdrawn therefrom includes: a pair of outer rails arranged under the storage part and fixedly mounted to the housing; inner rails having lengths shorter than lengths of the outer rails and provided at the outer rails to move therealong, each of the inner rails being connected to a first-side bottom surface of the storage part in a longitudinal direction thereof; and a support part supporting a bottom surface of the storage part by being in contact with the bottom surface of the storage part.

6 Claims, 9 Drawing Sheets

[FIG. 1]
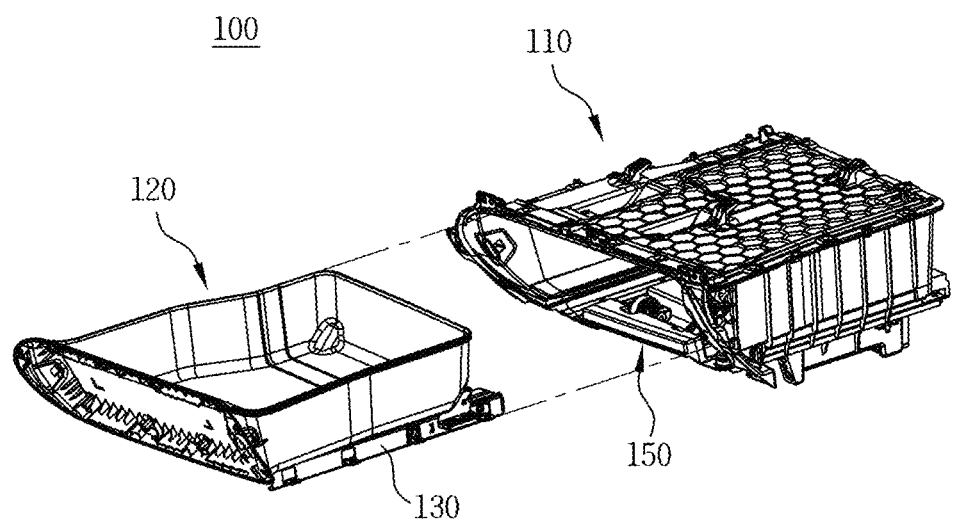

[FIG. 2]
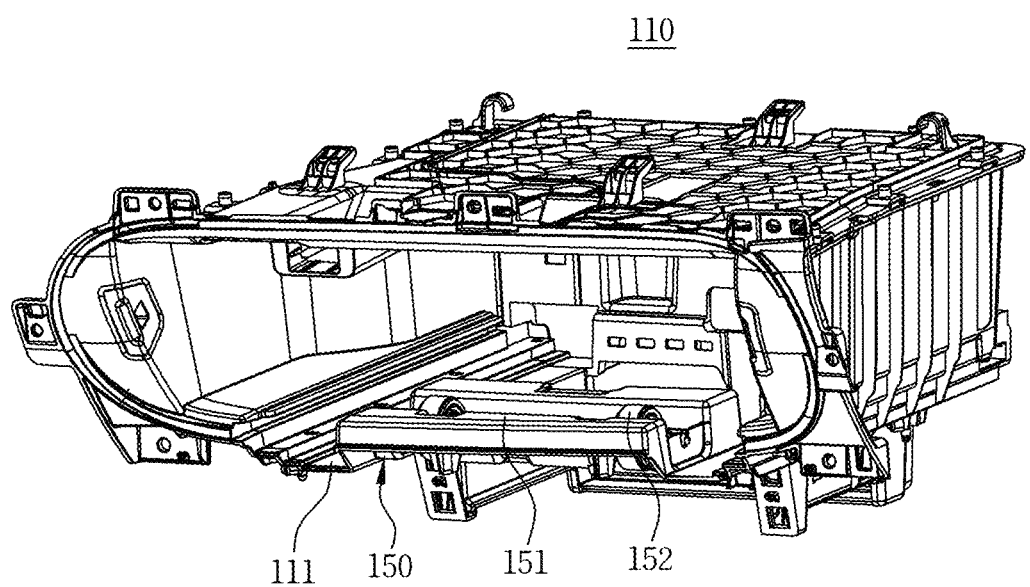

[FIG. 3]
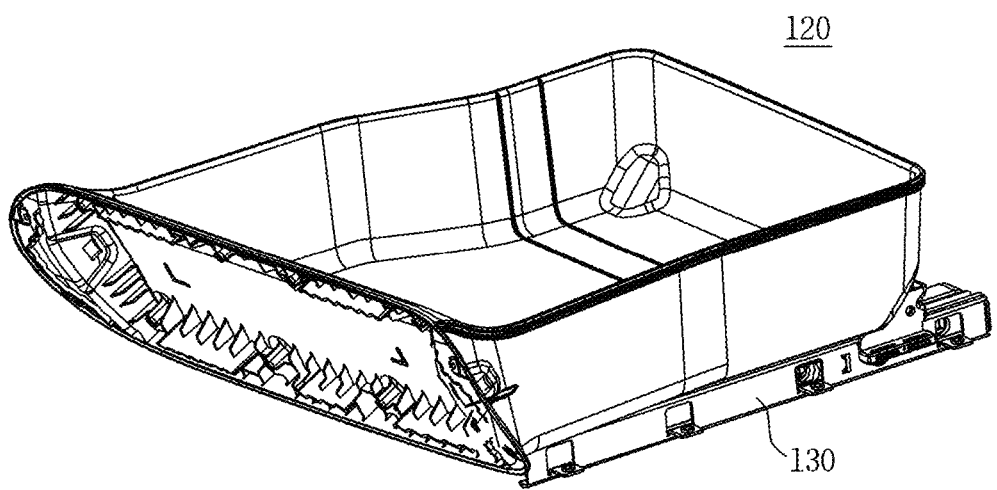

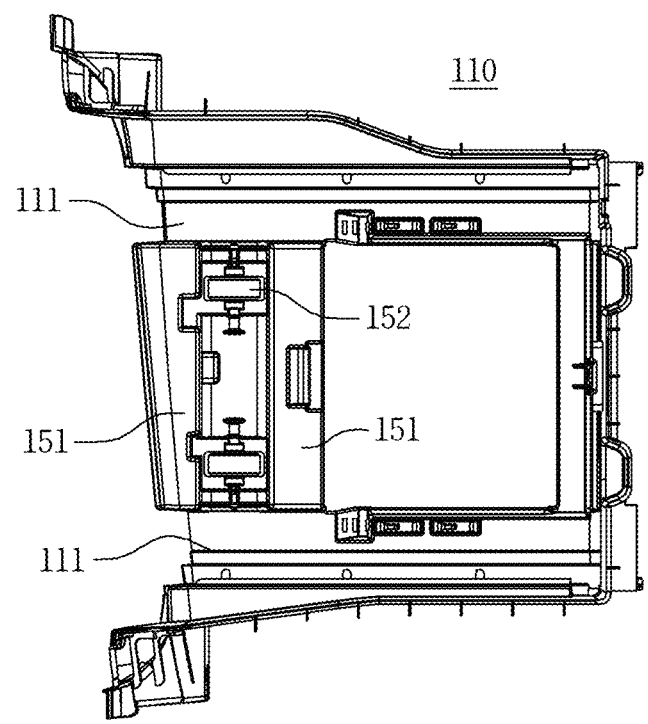
[FIG. 4]

[FIG. 5]
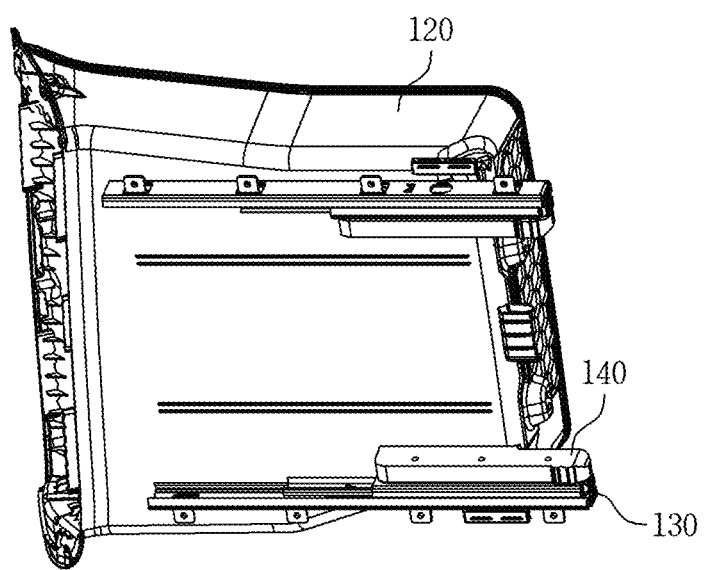

[FIG. 6]
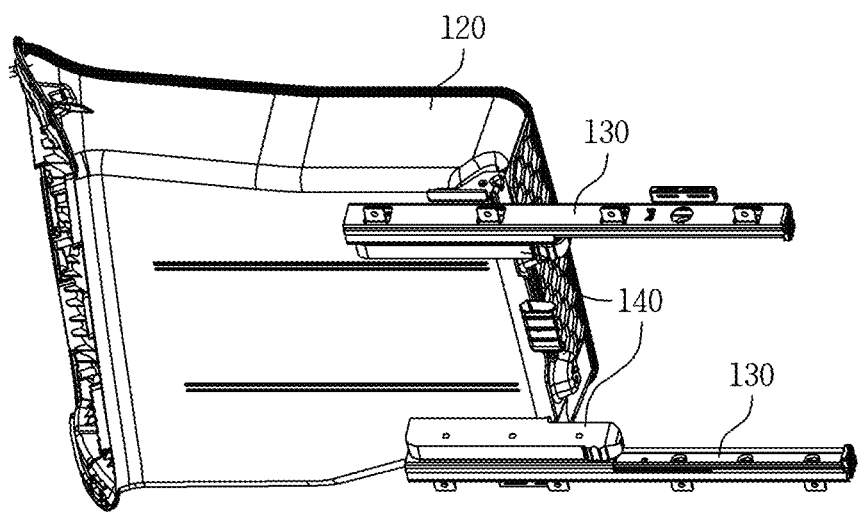

[FIG. 7]
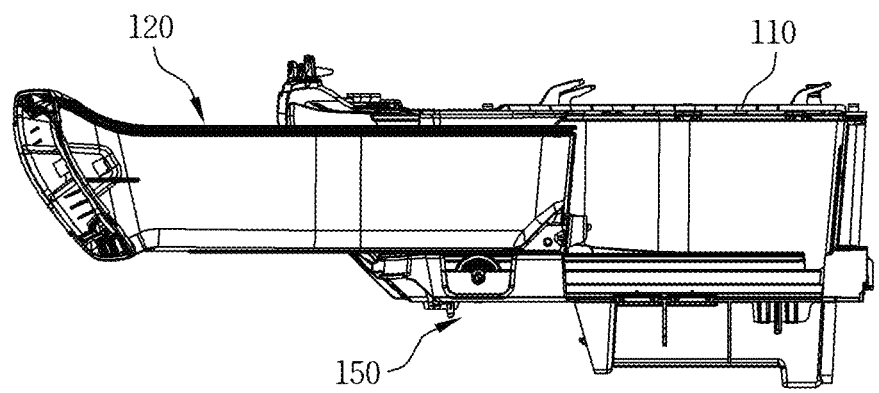

[FIG. 8]
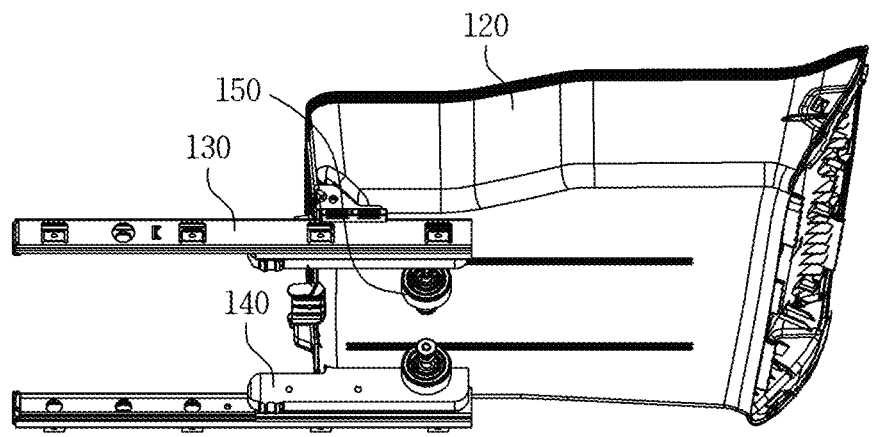

[FIG. 9]
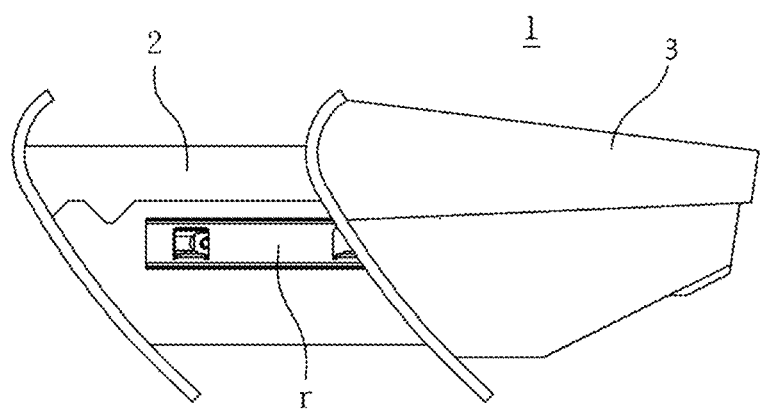

SLIDING TYPE GLOVE BOX

CROSS REFERENCE TO RELATED APPLICATION

The present application claims priority to Korean Patent Application No. 10-2020-0094734, filed Jul. 29, 2020, the entire contents of which is incorporated herein for all purposes by this reference.

BACKGROUND OF THE INVENTION

Field of the Invention

The present disclosure relates to a sliding type glove box which is configured to be rectilinearly reciprocated by a guide rail in an instrument panel of a vehicle so as to be opened and closed.

Description of the Related Art

Generally, an instrument panel in which an indicator, an operation switch, and an audio system, etc. are installed is provided at a front portion inside a vehicle.

In addition, a glove box for storing goods used inside a vehicle is installed at a side of the instrument panel, that is, at a passenger side, such that the glove box can be opened and closed.

The glove box may largely include: a housing mounted to the instrument panel; a storage part provided in the housing; and a front panel mounted to a front portion of the storage part.

The storage part has space in which goods can be received, and may be opened and closed at the housing by rotating.

The front panel is a component mounted to a groove part formed in the front portion of the storage part, and has a handle which is gripped by a user.

Generally, in the glove box described above, the storage part is configured to be opened and closed at the housing mounted to the instrument panel by rotating.

However, recently, as the inner space of a vehicle has been expanded, a glove box configured to be opened and closed by rectilinearly reciprocating slidably in the instrument panel is being applied to a vehicle.

In the sliding type glove box, the storage part in the instrument panel is configured to be opened and closed by moving rectilinearly along a guide rail.

However, as illustrated in FIG. 9, in the existing sliding type glove box 1, when the storage part 2 is withdrawn from the housing 3 fixedly mounted to the instrument panel (not shown), the guide rail r is configured to move together with the storage part and is exposed to the outside, which causes an unattractive appearance.

In addition, in the existing sliding type glove box 1, to support the weight of the storage part, the guide rail r is provided at each of opposite sides of the storage part 2, so the inner space of the storage part 2 is reduced due to volume occupied by the guide rail r.

Accordingly, in order to solve the above problems, the present applicant has proposed the sliding type glove box of the present disclosure, and as a related prior art, "Operation device of electric sliding glove box for vehicle" is disclosed in Korean Patent No. 10-2082171.

SUMMARY OF THE INVENTION

Accordingly, the present disclosure has been made keeping in mind the above problems occurring in the related art, and the present disclosure is intended to propose a sliding type glove box in which when a storage part is opened by being slidably withdrawn from a housing, the guide rail guiding the withdrawing direction of the storage part is not exposed to the outside, and force supporting the weight of the withdrawn storage part is increased.

In order to achieve the above objectives, according to one aspect of the present disclosure, there is provided a sliding type glove box including a housing mounted to an instrument panel and a storage part provided in an inner space of the housing so as to be slidably withdrawn therefrom, the glove box including: a pair of outer rails arranged under the storage part and fixedly mounted to the housing; inner rails having lengths shorter than lengths of the outer rails and provided at the outer rails to move therealong, each of the inner rails being connected to a first-side bottom surface of the storage part in a longitudinal direction thereof; and a support part supporting a bottom surface of the storage part.

In addition, the housing may include a pair of coupling frames allowing the outer rails to be mounted thereto, respectively, and the support part may support the bottom surface of the storage part while being arranged between the pair of coupling frames.

Additionally, the support part may include: a pair of support frames arranged in horizontal directions intersecting longitudinal directions of the coupling frames and connected to the coupling frames, the support frames being provided by being spaced apart from each other and in surface contract with the bottom surface of the storage part; and rollers provided rotatably between the pair of support frames and in rolling contact with the bottom surface of the storage part.

Furthermore, the support part may support the first-side bottom surface of the storage part in the longitudinal direction thereof when the storage part is withdrawn from the inner space of the housing, and may support a second-side bottom surface of the storage part in the longitudinal direction thereof when the storage part is received in the inner space of the housing.

In addition, when the storage part is withdrawn from the inner space of the housing, the inner rail may move from a first end of the outer rail in a longitudinal direction thereof to a second end of the outer rail in the longitudinal direction thereof, and only a portion of a first side of the storage part in the longitudinal direction thereof may be received in the inner space of the housing and a remaining portion of the storage part in the longitudinal direction thereof may be exposed to an outside of the housing.

Additionally, the support part may include rollers provided rotatably at the inner rails, respectively, and in rolling contact with the bottom surface of the storage part.

In the sliding type glove box according to the present disclosure, when the storage part storing goods is withdrawn from the housing mounted to the instrument panel, the rail guiding the moving direction of the storage part is not exposed to the outside of the instrument panel, thereby maintaining the beauty of the inner space of a vehicle.

In addition, in the sliding type glove box according to the present disclosure, the support part is configured to support the first-side bottom surface of the storage part in a longitudinal direction thereof, which is withdrawn from the housing, thereby preventing a force supporting the weight of the storage part from being reduced.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is an exploded perspective view of a sliding type glove box according to the embodiment of the present disclosure;

FIG. 2 is a perspective view of a housing according to the embodiment of the present disclosure;

FIG. 3 is a perspective view of a storage part according to the embodiment of the present disclosure;

FIG. 4 is a top plan view of the housing according to the embodiment of the present disclosure;

FIG. 5 is a perspective view of the storage part seen from a bottom portion thereof when an inner rail is arranged at a first side of an outer rail in a longitudinal direction thereof according to the embodiment of the present disclosure;

FIG. 6 is a perspective view of the storage part seen from the lower part when the inner rail is arranged at a second side of the outer rail in the longitudinal direction thereof according to the embodiment of the present disclosure;

FIG. 7 is a sectional view illustrating the storage part withdrawn from the housing according to the embodiment of the present disclosure;

FIG. 8 is a perspective view illustrating the configuration of a support part according to another embodiment of the present disclosure; and FIG. 9 is a view illustrating a conventional sliding type glove box.

DETAILED DESCRIPTION OF THE INVENTION

Advantages and features of the present disclosure, and a method of achieving the advantages and features will become apparent with reference to embodiments described later in detail with the accompanying drawings.

However, the present disclosure is not limited to the embodiments disclosed below, but may be implemented in various forms. The embodiments are provided to make the present disclosure complete, and to fully inform the scope of the present disclosure to those skilled in the art to which the present disclosure belongs, and the present disclosure is defined only by the scope of the claims.

Hereinafter, a sliding type glove box according to the embodiment of the present disclosure will be described in detail with reference to FIGS. 1 to 8. In describing the sliding type glove box of the present disclosure, detailed descriptions of related known functions or configurations are omitted so as not to obscure the subject matter of the present disclosure.

FIG. 1 is an exploded perspective view of a sliding type glove box according to the embodiment of the present disclosure; FIG. 2 is a perspective view of a housing according to the embodiment of the present disclosure; FIG. 3 is a perspective view of a storage part according to the embodiment of the present disclosure; FIG. 4 is a top plan view of the housing according to the embodiment of the present disclosure; FIG. 5 is a perspective view of the storage part seen from a lower part thereof when an inner rail is arranged at a first side of an outer rail in a longitudinal direction thereof according to the embodiment of the present disclosure; FIG. 6 is a perspective view of the storage part seen from the lower part when the inner rail is arranged at a second side of the outer rail in the longitudinal direction thereof according to the embodiment of the present disclosure; FIG. 7 is a sectional view illustrating the storage part withdrawn from the housing according to the embodiment of the present disclosure; and FIG. 8 is a perspective view illustrating the configuration of a support part according to another embodiment of the present disclosure.

As illustrated in FIGS. 1 to 8, the sliding type glove box 100 according to the embodiment of the present disclosure may largely include: the housing 110 mounted to an instrument panel (not shown), and the storage part 120 provided in inner space of the housing so as to be slidably withdrawn therefrom.

As described above, the housing 110 may be considered to be a component mounted to the instrument panel and, as illustrated in FIG. 2, may have space in which the storage part 120 can be received.

As illustrated in FIGS. 1 and 3, the storage part 120 may have a box shape having an open upper part and may be mounted in the inner space defined by the housing 110.

In addition, as illustrated in FIGS. 4 to 7, the sliding type glove box 100 according to the embodiment of the present disclosure may include: a pair of outer rails 130 arranged under the storage part 120 and fixedly mounted to the housing 110; inner rails 140 having lengths shorter than lengths of the outer rails 130 and provided to move along the outer rails 130, each of the inner rails being connected to a first-side bottom surface of the storage part in a longitudinal direction thereof; and the support part 150 supporting the bottom surface of the storage part 120.

The outer rail 130 may be considered as a component mounted in the inner space defined by the housing 110, and may have a U-shaped cross section. For reference, in the embodiment of the present disclosure, the outer rail 130 is illustrated to be separated from the housing 110 in FIG. 1 such that the configuration of the outer rail 130 is easily grasped.

The outer rail 130 is provided as a pair of outer rails provided in the inner space of the housing 110 by being spaced apart from each other and may be arranged under each of the opposite sides of the storage part 120 in a width direction thereof.

The inner rail 140 is a component moving along the longitudinal direction of the outer rail 130, and may be connected to the bottom surface of the storage part 120. Accordingly, the storage part 120 may be rectilinearly reciprocated along the longitudinal direction of the outer rail 130 by the movement of the inner rail 140.

Meanwhile, as described above, the inner rail 140 is connected to the first-side bottom surface of the storage part 120 in the longitudinal direction thereof. Accordingly, as illustrated in FIG. 6, when the inner rail 140 moves from a first side of the outer rail 130 in a longitudinal direction thereof to a second side thereof in the longitudinal direction, the storage part 120 may be moved such that a portion of a second side of the storage part 120 in the longitudinal direction thereof is exposed to the outside of the housing 110.

Contrarily, when the inner rail 140 moves from the second side of the outer rail 130 in the longitudinal direction thereof to the first side in the longitudinal direction, the storage part 120 may be moved such that the storage part 120 is received in the housing 110.

As illustrated in FIGS. 2 and 4, the support part 150 is arranged between coupling frames 111 of the housing 110 and may support the bottom surface of the storage part 120.

For reference, each of the coupling frames 111 of the housing 110 may be considered as a component coupled to the outer rail 130. The coupling frame 111 may be provided as a pair of coupling frames located at the inner bottom part of the housing 110 by being spaced apart from each other.

The support part 150 may include: a pair of support frames 151 arranged in horizontal directions intersecting longitudinal directions of the coupling frames 111 and connected to the coupling frames 111, the support frames being provided by being spaced apart from each other and in surface contract with the bottom surface of the storage part 120; and rollers 152 provided rotatably between the pair of support frames 151 and in rolling contact with the bottom surface of the storage part 120.

The pair of support frames 151 may be arranged between the pair of coupling frames 111, and the opposite ends of each of the support frames 151 in a longitudinal direction thereof may be connected to the pair of coupling frames 111, respectively.

In addition, each of the support frames 151 is provided to have height higher than the height of the coupling frame 111 and may be in surface contact with the bottom surface of the storage part 120.

The rollers 152 are in rolling contact with the bottom surface of the storage part 120 such that the storage part 120 is easily moved and, together with the support frames 151, function to support the bottom surface of the storage part 120.

In other words, when the storage part 120 moves to be opened or closed, the rollers 152 are in rolling contact with the bottom surface of the storage part 120 such that the storage part 120 is easily moved. Furthermore, when the storage part 120 stops, the rollers 152, together with the pair of support frames 151 for supporting the storage part 120, may support the bottom surface of the storage part 120.

The support part 150 configured as described above is located at the second side portion of the housing 110 in the longitudinal direction thereof and functions to support the second-side bottom surface or first-side bottom surface of the storage part 120 in the longitudinal direction thereof.

That is, when the storage part 120 is withdrawn from the inner space of the housing 110, the support part 150 may support the first-side bottom surface of the storage part 120 in the longitudinal direction thereof. Contrarily, when the storage part 120 is received in the inner space of the housing 110, the support part 150 may support the second-side bottom surface of the storage part in the longitudinal direction thereof.

As illustrated in FIGS. 6 and 7, when the storage part 120 is moved to be withdrawn from the inner space of the housing 110, the remaining portion of the storage part 120 except for the portion of the first side of the storage part 120 in the longitudinal direction thereof is exposed to the outside of the housing 110. In this case, only the first-side bottom surface of the storage part 120 in the longitudinal direction is connected to the inner rail 140, so although the storage part 120 is withdrawn from the housing 110, the outer rail 130 or the inner rail 140 is not be exposed to the outside of the housing 110. Accordingly, the outer rail 130 or the inner rail 140 is not exposed to the outside to prevent the exterior beauty of the glove box from deteriorating.

However, the longitudinal portion of the storage part 120 exposed to the outside of the housing 110 is not supported by a separate member, so pressure due to the weight of goods is intensively transmitted to the portion of the first side of the storage part 120 relatively not exposed to the outside of the housing 110. That is, pressure due to the weight of goods is intensively transmitted to the first-side bottom surface of the storage part 120 connected to the inner rail 140.

Accordingly, the support part 150 is provided such that the first-side bottom surface of the storage part 120 in the longitudinal direction thereof can withstand pressure due to the weight of goods. The support part 150 is in contact with a portion of the bottom surface of the storage part 120 not connected to the inner rail 140 and functions to prevent the first-side bottom surface of the storage part 120 from being deformed or damaged due to the weight of goods.

Accordingly, in the glove box 100 according to the embodiment of the present disclosure, although the storage part 120 is slidably withdrawn from the housing 110 to open the storage part 120, the rails are not exposed to the outside so as to prevent the deterioration of the exterior beauty of the glove box 100. Particularly, the disadvantage that the force of supporting the weight of the storage part 120 is reduced by this rail-hiding structure is compensated by the support part 150 according to the embodiment of the present disclosure, thereby maintaining durability of the glove box.

Although the specific embodiments according to the present invention have been described so far, various modifications are possible without departing from the scope of the present disclosure.

For example, in the embodiment of the present disclosure, the support part 150 is described and illustrated in the drawings to be provided at the bottom part of the housing 110 with the support part 150 connected to the coupling frames 111 of the housing 110, but is not limited thereto.

As illustrated in FIG. 8, the support part 150 is embodied as a roller and is provided to be rotatable at the inner rail 140 and thus may support the first-side bottom surface of the storage part 120 in the longitudinal direction thereof.

Therefore, the scope of the present disclosure should not be defined by being limited to the embodiments described above, but should be defined not only by the scope of the claims to be described later, but also by equivalents to the scope of the claims.

What is claimed is:

1. A sliding type glove box comprising a housing mounted to an instrument panel and a storage part provided in an inner space of the housing so as to be slidably withdrawn therefrom, the glove box comprising:
   a pair of outer rails arranged under the storage part and fixedly mounted to the housing;
   inner rails having lengths shorter than lengths of the outer rails and provided at the outer rails to move therealong, each of the inner rails being connected to a first-side bottom surface of the storage part in a longitudinal direction thereof; and
   a support part supporting a bottom surface of the storage part.

2. The glove box of claim 1, wherein the housing comprises a pair of coupling frames allowing the outer rails to be mounted thereto, respectively, and
   the support part supports the bottom surface of the storage part while being arranged between the pair of coupling frames.

3. The glove box of claim 2, wherein the support part comprises a pair of support frames arranged in horizontal directions intersecting longitudinal directions of the coupling frames and connected to the coupling frames, the support frames being provided by being spaced apart from each other and in surface contract with the bottom surface of the storage part; and
   rollers provided rotatably between the pair of support frames and in rolling contact with the bottom surface of the storage part.

4. The glove box of claim 3, wherein the support part supports the first-side bottom surface of the storage part in the longitudinal direction thereof when the storage part is withdrawn from the inner space of the housing, and supports a second-side bottom surface of the storage part in the longitudinal direction thereof when the storage part is received in the inner space of the housing.

5. The glove box of claim 4, wherein when the storage part is withdrawn from the inner space of the housing, the inner rail moves from a first end of the outer rail in a longitudinal direction thereof to a second end of the outer rail in the longitudinal direction thereof, and only a portion of a first side of the storage part in the longitudinal direction thereof is received in the inner space of the housing and a remaining portion of the storage part in the longitudinal direction thereof is exposed to an outside of the housing.

6. The glove box of claim 2, wherein the support part comprises rollers provided rotatably at the inner rails, respectively, and in rolling contact with the bottom surface of the storage part.

* * * * *